United States Patent
Iversen

(10) Patent No.: US 9,172,404 B1
(45) Date of Patent: Oct. 27, 2015

(54) SWITCH ARCHITECTURE FOR TDMA AND FDD MULTIPLEXING

(75) Inventor: Christian Rye Iversen, Vestbjerg (DK)

(73) Assignee: RF Micro Devices, Inc., Greensboro, NC (US)

( * ) Notice: Subject to any disclaimer, the term of this patent is extended or adjusted under 35 U.S.C. 154(b) by 2704 days.

(21) Appl. No.: 11/052,435

(22) Filed: Feb. 7, 2005

(51) Int. Cl.
*H04J 4/00* (2006.01)
*H04B 1/00* (2006.01)
*H04B 1/16* (2006.01)

(52) U.S. Cl.
CPC .............. *H04B 1/0082* (2013.01); *H04B 1/163* (2013.01)

(58) Field of Classification Search
CPC ...... H04B 1/163; H04B 1/0082; H04B 1/005; H04B 1/0057; H04B 1/006; H04B 1/408; H04B 1/54; H04B 1/406; H04B 1/56; H04B 1/50
USPC ......... 370/280, 281, 319, 321, 337, 344, 345, 370/347, 442, 465; 455/78
See application file for complete search history.

(56) References Cited

U.S. PATENT DOCUMENTS

| | | | |
|---|---|---|---|
| 3,872,325 A | 3/1975 | Adams et al. .................. 307/251 |
| H646 H * | 6/1989 | Tsui ............................... 343/895 |
| 4,890,077 A | 12/1989 | Sun ............................... 333/81 A |
| 5,345,123 A | 9/1994 | Staudinger et al. ............ 307/552 |
| 5,521,561 A * | 5/1996 | Yrjola et al. .................... 333/103 |
| 5,546,051 A * | 8/1996 | Koizumi et al. ............... 330/297 |
| 5,548,239 A | 8/1996 | Kohama .......................... 327/408 |
| 5,715,525 A * | 2/1998 | Tarusawa et al. .............. 455/101 |
| 5,754,536 A * | 5/1998 | Schmidt ......................... 370/330 |
| 5,767,721 A | 6/1998 | Crampton ...................... 328/308 |
| 5,774,792 A | 6/1998 | Tanaka et al. ................... 485/78 |
| 5,794,159 A * | 8/1998 | Portin ......................... 455/553.1 |
| 5,852,603 A * | 12/1998 | Lehtinen et al. ............... 370/280 |
| 5,881,369 A * | 3/1999 | Dean et al. ....................... 455/78 |
| 5,889,766 A * | 3/1999 | Ohnishi et al. ................ 370/307 |
| 5,903,178 A | 5/1999 | Miyatsuji et al. .............. 327/308 |
| 5,903,820 A * | 5/1999 | Hagstrom ........................ 455/82 |
| 5,915,212 A * | 6/1999 | Przelomiec et al. ............ 455/83 |
| 5,926,466 A * | 7/1999 | Ishida et al. ................... 370/280 |
| 6,081,168 A * | 6/2000 | Park .............................. 331/179 |
| 6,130,897 A * | 10/2000 | Ishida et al. ................... 370/478 |
| 6,212,172 B1 * | 4/2001 | Barabash et al. .............. 370/277 |
| 6,218,890 B1 | 4/2001 | Yamaguchi et al. ........... 327/427 |
| 6,249,670 B1 * | 6/2001 | Kunkel et al. ................... 455/83 |
| 6,434,122 B2 * | 8/2002 | Barabash et al. .............. 370/277 |
| 6,496,072 B2 | 12/2002 | Cho et al. ....................... 330/284 |
| 6,535,748 B1 * | 3/2003 | Vuorio et al. ............... 455/552.1 |
| 6,630,899 B2 * | 10/2003 | Jayaraman ..................... 341/200 |
| 6,642,578 B1 | 11/2003 | Arnold et al. ................. 257/341 |

(Continued)

*Primary Examiner* — Hoang-Chuong Vu
(74) *Attorney, Agent, or Firm* — Withrow & Terranova, P.L.L.C.

(57) ABSTRACT

Switching circuitry is provided for a mobile terminal having a Time Division Multiple Access (TDMA) mode of operation and a Frequency Division Duplex (FDD) mode of operation. The switching circuitry includes resonant tank circuitry having a controllable resonant frequency and an output coupled to an antenna of the mobile terminal. The switching circuitry also includes a transmit switch that couples TDMA transmit circuitry to an input of the resonant tank circuitry when transmitting in the TDMA mode of operation, a receive switch that couples TDMA receive circuitry to the input of the resonant tank circuitry when receiving in the TDMA mode of operation, and a FDD switch that couples a FDD transceiver to the output of the resonant tank circuitry when in the FDD mode of operation. The controllable resonant frequency is controlled such that the transmit and receive switches are isolated from the antenna during FDD operation.

26 Claims, 4 Drawing Sheets

(56) References Cited

U.S. PATENT DOCUMENTS

| | | | |
|---|---|---|---|
| 6,730,953 B2 | 5/2004 | Brindle et al. | 257/296 |
| 6,803,680 B2 | 10/2004 | Brindle et al. | 307/115 |
| 7,142,884 B2* | 11/2006 | Hagn | 455/552.1 |
| 7,155,193 B2* | 12/2006 | Rowe et al. | 455/296 |
| 7,203,472 B2 | 4/2007 | Seppinen et al. | 455/226.1 |
| 7,248,567 B2* | 7/2007 | Desgagné et al. | 370/277 |
| 7,292,557 B2* | 11/2007 | Neumann et al. | 370/337 |
| 7,349,717 B2* | 3/2008 | Block et al. | 455/552.1 |
| 2001/0012283 A1* | 8/2001 | Miya et al. | 370/342 |
| 2002/0039889 A1* | 4/2002 | Boos | 455/77 |
| 2002/0090974 A1* | 7/2002 | Hagn | 455/552 |
| 2002/0105913 A1* | 8/2002 | Miya | 370/241 |
| 2002/0163981 A1* | 11/2002 | Troemel, Jr. | 375/345 |
| 2002/0176375 A1* | 11/2002 | Barabash et al. | 370/277 |
| 2003/0156574 A1* | 8/2003 | Raaf | 370/350 |
| 2004/0092244 A1* | 5/2004 | Tiller | 455/323 |
| 2004/0092285 A1* | 5/2004 | Kodim | 455/552.1 |
| 2004/0113746 A1 | 6/2004 | Brindle | 337/167 |
| 2004/0113747 A1 | 6/2004 | Kelcourse | 337/167 |
| 2004/0141470 A1 | 7/2004 | Kelcourse et al. | 370/282 |
| 2004/0204035 A1* | 10/2004 | Raghuram et al. | 455/553.1 |
| 2004/0252659 A1* | 12/2004 | Yun et al. | 370/328 |
| 2005/0037800 A1* | 2/2005 | Shih | 455/550.1 |
| 2005/0100105 A1* | 5/2005 | Jensen | 375/259 |
| 2005/0124301 A1* | 6/2005 | Schmitz et al. | 455/83 |
| 2006/0003784 A1* | 1/2006 | Chion et al. | 455/518 |
| 2006/0025099 A1* | 2/2006 | Jung et al. | 455/313 |
| 2006/0135195 A1* | 6/2006 | Leinonen et al. | 455/550.1 |
| 2006/0141944 A1* | 6/2006 | Shibagaki et al. | 455/78 |
| 2006/0194550 A1* | 8/2006 | Block et al. | 455/78 |
| 2006/0256754 A1* | 11/2006 | Liu et al. | 370/335 |
| 2007/0275674 A1* | 11/2007 | Chien | 455/90.2 |

* cited by examiner

SWITCH ARCHITECTURE FOR TDMA AND FDD MULTIPLEXING

FIELD OF THE INVENTION

The present invention relates to a switch architecture for a mobile terminal and more particularly relates to a switch architecture for Time Division Multiple Access (TDMA) and Frequency Division Duplex (FDD) multiplexing in a mobile terminal.

BACKGROUND OF THE INVENTION

As wireless communication standards evolve, a need has arisen for a mobile terminal that accommodates both the Global System for Mobile Communication (GSM) standard and Wide-Band Code Division Multiple Access (WCDMA) standards, such as the Universal Mobile Telecommunication System (UMTS) Terrestrial Radio Access Frequency Division Duplex (UTRA/FDD) standard. A mobile terminal accommodating both of these standards includes transmit and receive circuitry for GSM operation and transmit and receive circuitry for UTRA/FDD operation. Since it is also desirable for the mobile terminal to include a single antenna, there remains a need for a switch architecture that couples transmit and receive circuitry for GSM operation to the antenna during GSM operation and couples transmit and receive circuitry for UTRA/FDD operation to the antenna during UTRA/FDD operation.

A conventional switch architecture that may be used for this purpose simply includes controllable switches for coupling each of the transmit and receive paths for GSM operation to the antenna during GSM operation and a controllable switch for coupling the UTRA/FDD transceiver to the antenna during UTRA/FDD operation. However, a major problem for this architecture is intermodulation distortion. More specifically, during UTRA/FDD operation, the transmit frequency from the UTRA/FDD transceiver mixes with blocking signals, such as transmit signals from nearby mobile terminals, to produce intermodulation distortion that disturbs the UTRA/FDD reception and degrades the operation of the mobile terminal.

Thus, there remains a need for a switch architecture that reduces or substantially eliminates non-linearities during FDD operation such that a magnitude of intermodulation distortion during FDD operation is substantially reduced.

SUMMARY OF THE INVENTION

The present invention provides switching circuitry for a mobile terminal having a Time Division Multiple Access (TDMA) mode of operation and a Frequency Division Duplex (FDD) mode of operation. In general, the switching circuitry includes resonant tank circuitry having a controllable resonant frequency and an output coupled to an antenna of the mobile terminal. The switching circuitry also includes a TDMA transmit switch that couples TDMA transmit circuitry to an input of the resonant tank circuitry when transmitting in the TDMA mode of operation, a TDMA receive switch that couples TDMA receive circuitry to the input of the resonant tank circuitry when receiving in the TDMA mode of operation, and a FDD switch that couples a FDD transceiver to the output of the resonant tank circuitry when in the FDD mode of operation. When operating in the FDD mode of operation, the FDD switch couples the FDD transceiver to the antenna, and the controllable resonant frequency is controlled such that the resonant tank circuitry isolates the TDMA transmit and receive switches from the antenna.

In one embodiment, when in the FDD mode of operation, the controllable resonant frequency may be set to be approximately equal to a center frequency of a transmit frequency band of the FDD transceiver in order to isolate the TDMA transmit and receive switches from the antenna. When in the TDMA mode of operation, the controllable resonant frequency is controlled such that the TDMA transmit and receive switches are not isolated from the antenna. Further, in one embodiment, when in the TDMA mode of operation, the controllable resonant frequency may be set to provide attenuation of a harmonic of a center frequency of the desired transmit frequency for the TDMA mode of operation.

To accommodate numerous frequency bands for the TDMA mode of operation, the switching circuitry may include numerous TDMA transmit and receive switches each coupling corresponding TDMA transmit or receive circuitry to the input of the resonant tank circuitry.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
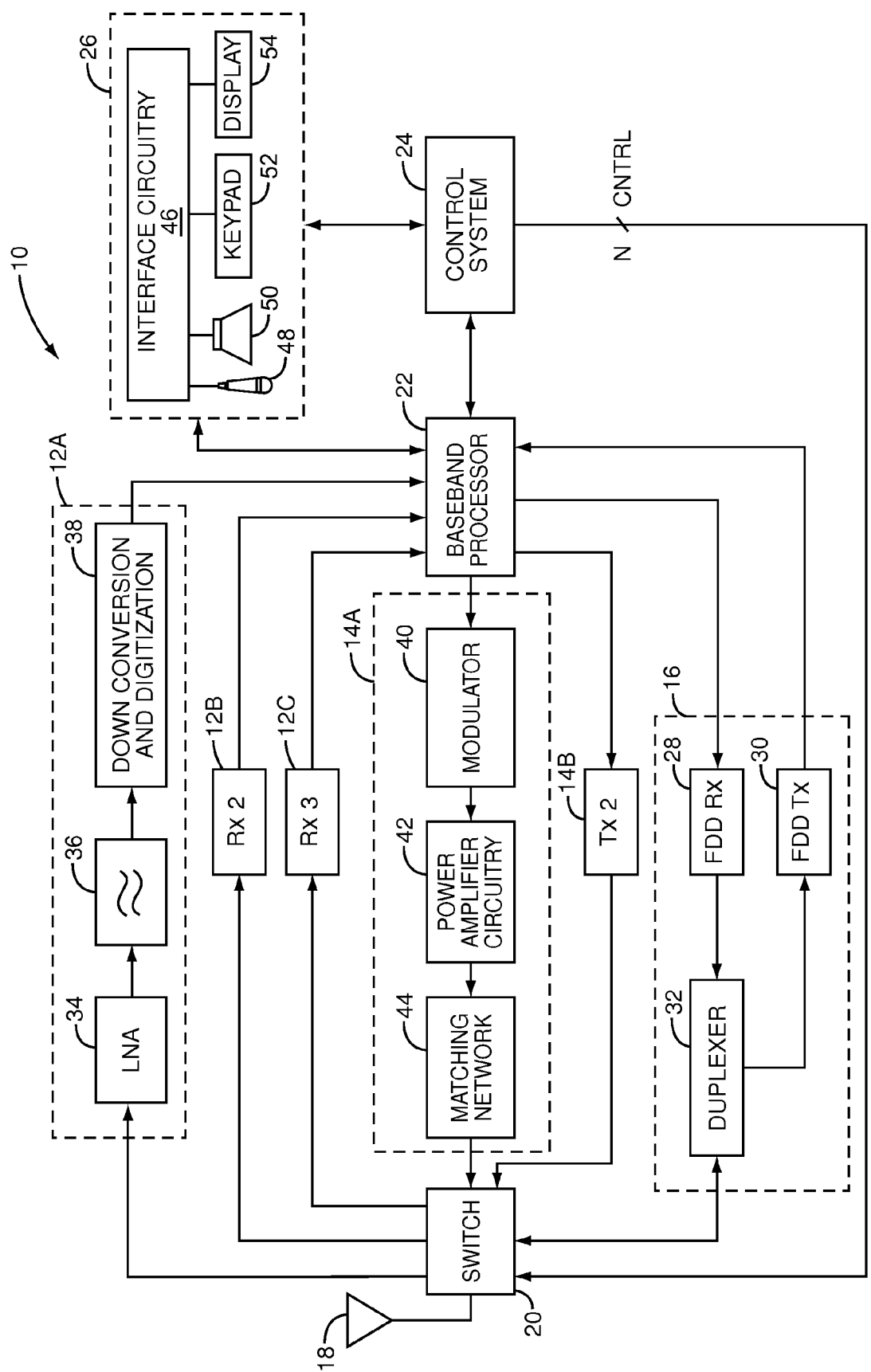
FIG. 1 illustrates an exemplary mobile terminal including switching circuitry for Time Division Multiple Access (TDMA) and Frequency Division Duplex (FDD) multiplexing according to one embodiment of the present invention.

The present invention may be incorporated in a mobile terminal 10, such as a mobile telephone, wireless personal digital assistant, wireless Local Area Network (LAN) device, wireless base station, or like wireless communication device. The basic architecture of an exemplary mobile terminal 10 is represented in FIG. 1 and may include a receiver front ends 12A-12C, radio frequency transmitters 14A and 14B, a Frequency Division Duplex (FDD) transceiver 16, an antenna 18, switching circuitry 20, a baseband processor 22, a control system 24, and an interface 26. The FDD transceiver 16 includes a FDD receiver front end 28, a FDD transmitter 30, and a duplexer 32, and operates to transmit and receive radio frequency signals simultaneously, as will be apparent to one of ordinary skill in the art.

The receiver front end 12A receives information bearing radio frequency signals in a first frequency band from one or more remote transmitters provided by a base station. A low noise amplifier 34 amplifies the signal. A filter circuit 36 minimizes broadband interference in the received signal, while downconversion and digitization circuitry 38 downconverts the filtered, received signal to an intermediate or baseband frequency signal, which is then digitized into one or more digital streams. The receiver front end 12A typically uses one or more mixing frequencies generated by a frequency synthesizer (not shown).

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs).

The receiver front ends 12B and 12C are similar in detail to the receiver front end 12A and operate to receive information bearing radio frequency signals in second and third frequency bands, respectively. The FDD receiver front end 28 is also similar in detail to the receiver front end 12A and operates to receive radio frequency signals in a receive frequency band of the FDD transceiver 16.

Referring to the radio frequency transmitter 14A, the baseband processor 22 receives digitized data, which may represent voice, data, or control information, from the control system 24, which it encodes for transmission. The encoded data is output to the radio frequency transmitter 14A, where it is used by a modulator 40 to modulate a carrier signal that is at a desired transmit frequency. Power amplifier circuitry 42 amplifies the modulated carrier signal to a level appropriate for transmission, and delivers the modulated carrier signal to antenna 18 through a matching network 44.

The radio frequency transmitter 14B is similar in detail to the radio frequency transmitter 14A. However, the radio frequency transmitter 14B operates in a different frequency band than the radio frequency transmitter 14A. The FDD transmitter 30 is also similar in detail to the radio frequency transmitter 14A and operates to transmit radio frequency signals in a transmit frequency band of the FDD transceiver 16.

A user may interact with the mobile terminal 10 via the interface 26, which may include interface circuitry 46 associated with a microphone 48, a speaker 50, a keypad 52, and a display 54. The interface circuitry 46 typically includes analog-to-digital converters, digital-to-analog converters, amplifiers, and the like. Additionally, it may include a voice encoder/decoder, in which case it may communicate directly with the baseband processor 20.

The microphone 48 will typically convert audio input, such as the user's voice, into an electrical signal, which is then digitized and passed directly or indirectly to the baseband processor 20. Audio information encoded in the received signal is recovered by the baseband processor 20, and converted by the interface circuitry 46 into an analog signal suitable for driving speaker 50. The keypad 52 and display 54 enable the user to interact with the mobile terminal 10, input numbers to be dialed, address book information, or the like, as well as monitor call progress information.

As an exemplary embodiment, the mobile terminal 10 may operate according to either a Time Division Multiple Access (TDMA) standard, such as the Global System for Mobile Communications (GSM) standard, or a Frequency Division Duplex (FDD) standard, such as the Universal Mobile Telecommunication System (UMTS) Terrestrial Radio Access Frequency Division Duplex (UTRA/FDD) standard. Accordingly, the receiver front ends 12A-12C may operate to receive radio frequency signals in any three of the GSM frequency bands (GSM 850, EGSM 900, GSM 1800, GSM 1900). For example, the receiver front end 12A may operate to receive radio frequency signals in the GSM 850 frequency band, the receiver front end 12B may operate to receive radio frequency signals in the EGSM 900 frequency band, and the receiver front end 12C may operate to receive radio frequency signals in the GSM 1800 frequency band. It should be noted that in another embodiment, the mobile terminal 10 may include a fourth receiver front end (not shown) similar to the receiver front ends 12A-12C such that the mobile terminal 10 includes four receiver front ends each operating to receive one of the GSM frequency bands.

The radio frequency transmitter 14A may operate to transmit radio frequency signals in the GSM 1800 and GSM 1900 frequency bands, also referred to herein as "GSM high bands." The radio frequency transmitter 14B may operate to transmit radio frequency signals in the GSM 850 and EGSM 900 frequency bands, also referred to herein as "GSM low bands." The FDD transceiver 16 may operate to simultaneously transmit and receive radio frequency signals in any one of the six UTRA/FDD frequency bands. These frequency bands are shown in Table 1 below.

TABLE 1

| System and Band | Tx Frequency Band | Rx Frequency Band |
| --- | --- | --- |
| GSM 850 | 824-849 MHz | 869-894 MHz |
| GSM 900 | 880-915 MHz | 925-960 MHz |
| GSM 1800 (DCS) | 1710-1785 MHz | 1805-1880 MHz |
| GSM 1900 (PCS) | 1850-1910 MHz | 1930-1990 MHz |
| UTRA/FDD band I | 1920-1980 MHz | 2110-2160 MHz |
| UTRA/FDD band II | 1850-1910 MHz | 1930-1990 MHz |
| UTRA/FDD band III | 1710-1785 MHz | 1805-1880 MHz |
| UTRA/FDD band IV | 1710-1755 MHz | 2110-2155 MHz |
| UTRA/FDD band V | 824-849 MHz | 869-894 MHz |
| UTRA/FDD band VI | 830-840 MHz | 875-885 MHz |

In operation, the control system 24 operates to control the switching circuitry 20 such that only one of the receiver front ends 12A-12C, the radio frequency transmitters 14A and 14B, or the FDD transceiver 16 is coupled to the antenna 18 depending on the desired mode of operation.

Figure 2:
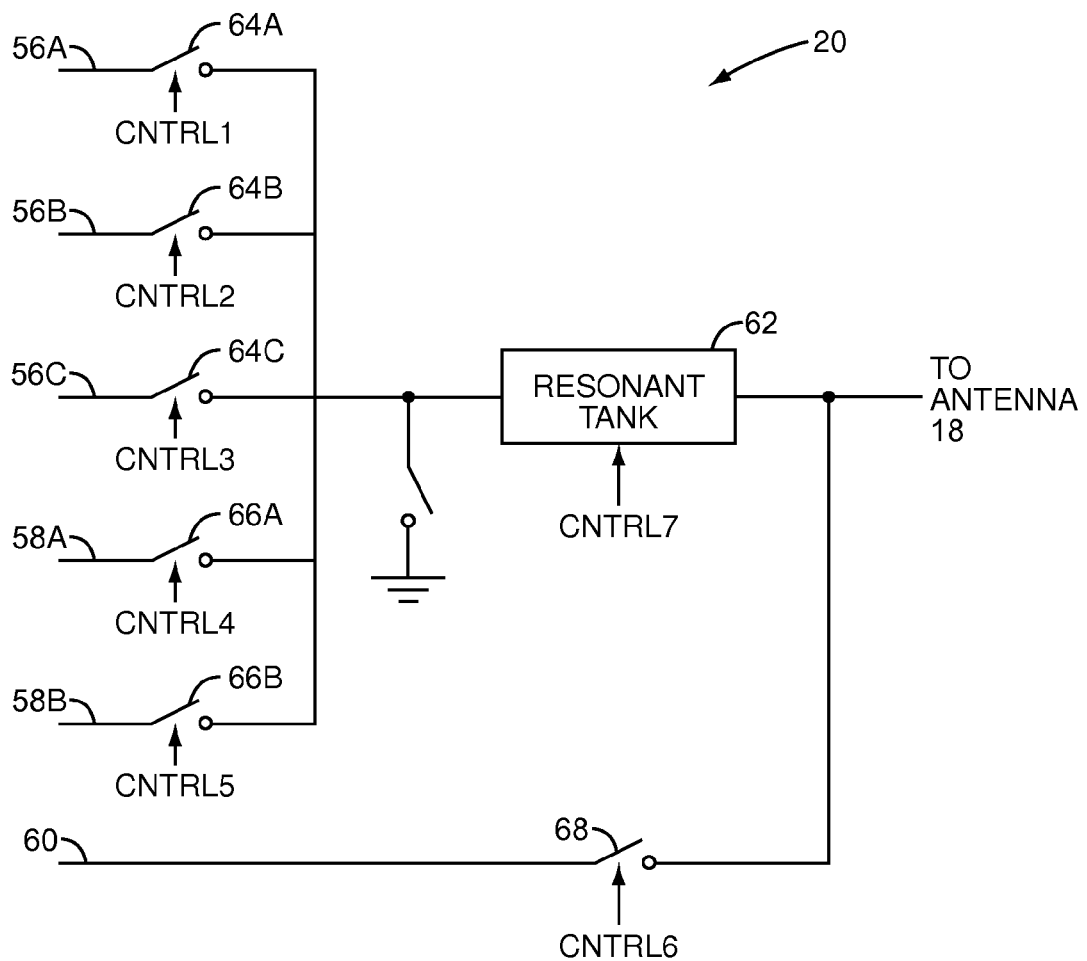
FIG. 2 illustrates the switching circuitry of FIG. 1 according to one embodiment of the present invention.

FIG. 2 illustrates an exemplary embodiment of the switching circuitry 20 according to one embodiment of the present invention. The switching circuitry 20 includes TDMA receiver ports 56A-56C coupled to the receiver front ends 12A-12C (FIG. 1), respectively, TDMA transmitter ports 58A, 58B coupled to the radio frequency transmitters 14A and 14B (FIG. 1), respectively, and a FDD port 60 coupled to the duplexer 32 (FIG. 1) of the FDD transceiver 16. The TDMA receiver ports 56A-56C are coupled to an input terminal of a resonant tank circuitry 62 by receive switches 64A-64C, and the TDMA transmitter ports 58A, 58B are coupled to the input terminal of the resonant tank circuitry 62 by transmit switches 66A and 66B. The FDD port 60 is coupled to an output terminal of the resonant tank circuitry 62 by FDD switch 68. The switches 64A, 64B, 64C, 66A, 66B, and 68 are controlled by control signals CNTRL1-CNTRL6, respectively. The control signals CNTRL1-CNTRL6 and a control signal CNTRL 7 for controlling the resonant tank circuitry 62 may be provided by the control system 24 (FIG. 1) based on the desired mode of operation. Each of the switches 64A-64C, 66A, 66B, and 68 may be transistor switches including one or more transistors, as will be apparent to one of ordinary skill in the art upon reading this disclosure.

It should be noted that the switching circuitry 20 may include any number of receive switches 64 and transmit switches 66 depending on the particular implementation. For example, as discussed above, the mobile terminal 10 may include four receiver front ends 12, each receiving radio frequency signals in one of the four GSM frequency bands. For this embodiment, the switching circuitry 20 may include four receive switches 64 rather than the three receive switches 64A-64C illustrated in FIG. 2.

The resonant tank circuitry 62 operates to isolate the switches 64A-64C and 66A-66B from the antenna 18 when the FDD switch 68 is closed during operation of the FDD transceiver 16. More specifically, the control signal CNTRL7 is provided such that a resonant frequency of the resonant tank circuitry 62 is essentially equal to a transmit frequency of the FDD transceiver 16 when the FDD switch 68 is closed for FDD operation. By doing so, the linearity of the switching circuitry 20 is increased, thereby decreasing the magnitude of intermodulation distortion caused by mixing of the transmit frequency of the FDD transceiver 16 and blocking signals, such as signals transmitted from nearby mobile terminals.

More specifically, by isolating the switches 64A-64C and 66A-66B from the antenna 18 during FDD operation, nonlinearities caused by voltages seen at the switches 64A-64C and 66A-66B are substantially reduced if not completely eliminated. As a result, the linearity of the switching circuitry 20 is increased for FDD mode, and the magnitudes of the intermodulation distortion products are reduced, thereby improving the performance of the switching circuitry 20.

As an example, assume that the mobile terminal of FIG. 1 supports the GSM bands and one of the UTRA/FDD bands (see Table 1 above). When the FDD switch 68 is closed for the UTRA/FDD mode of operation, the control signal CNTRL7 controls the resonant tank circuitry 62 such that the resonant frequency of the resonant tank circuitry 62 is essentially equal to the center frequency of a transmit frequency band of the FDD transceiver 16. Thus, for the transmit frequency of the FDD transceiver 16, the impedance of the resonant tank circuitry 62 for the transmit frequency of the FDD transceiver 16 is theoretically infinite and in actual implementation very large. For example, the impedance of the resonant tank circuitry 62 may be 1 MΩ for the transmit frequency of the FDD transceiver 16. As such, the resonant tank circuitry 62 isolates the switches 64A-64C and 66A-66B, which are in the off state, from the antenna 18.

When the mobile terminal 10 switches to a GSM mode of operation, one of the receive switches 64A-64C is closed when receiving radio frequency signals, and one of the transmit switches 66A-66B is closed when transmitting radio frequency signals. When in the GSM mode of operation, the FDD switch 68 is open and the control signal CNTRL7 is provided such that the resonant frequency of the resonant tank circuitry 62 is not near the center frequency of the transmit frequency band of the desired GSM frequency band. More specifically, the resonant frequency of the resonant tank circuitry 62 is controlled such that the resonant tank circuitry 62 provides a low impedance path between the switches 64A-64C and 66A-66B during GSM operation. In one embodiment, the resonant frequency of the resonant tank circuitry 62 may be set to a frequency near a harmonic of the center frequency of the transmit frequency band. For example, the resonant frequency may be set to 3.6 GHz to provide attenuation of the second harmonic of the GSM high band transmit frequencies when operating in either GSM 1800 or GSM 1900 mode.

Figure 3A:
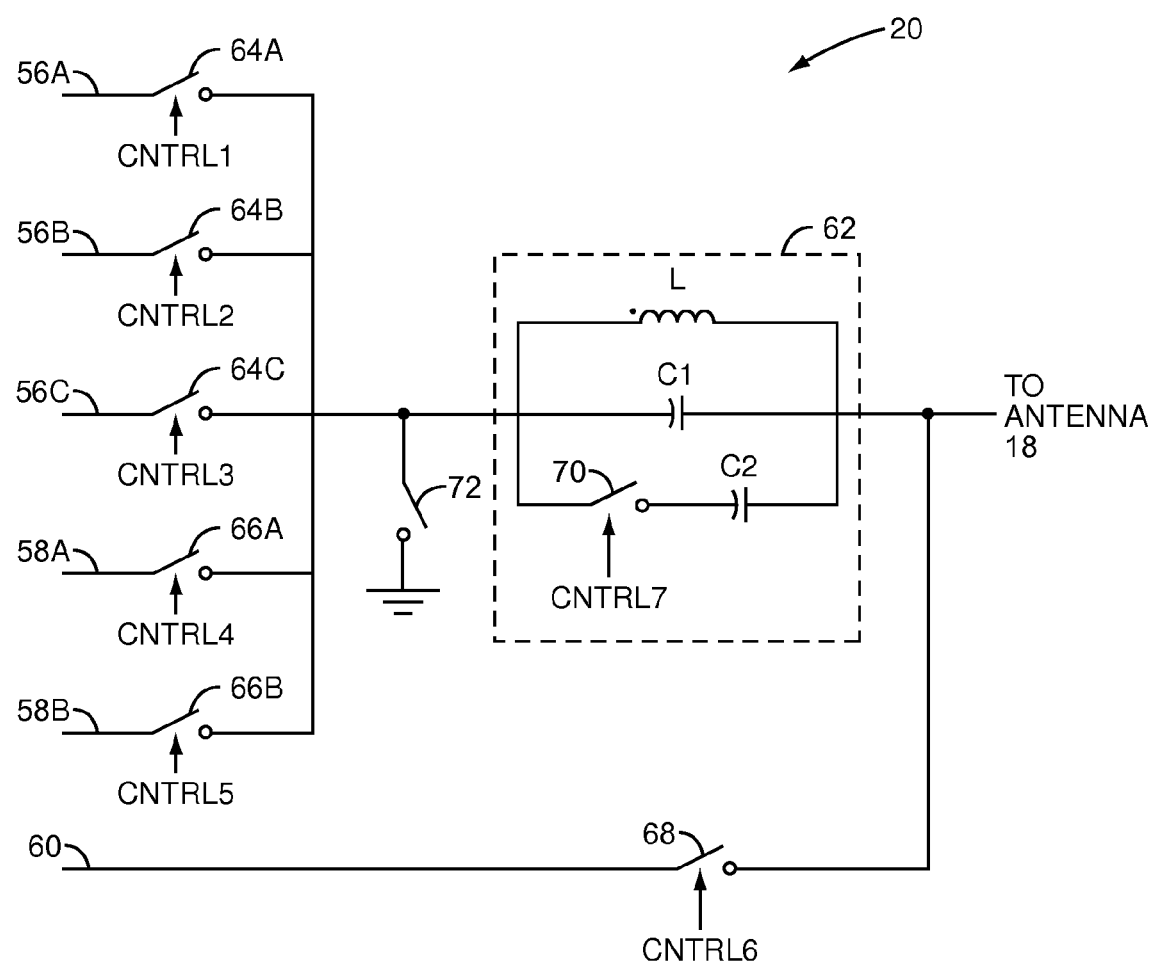
FIGS. 3A and 3B illustrate exemplary embodiments of the switching circuitry of FIG. 2 according to the present invention.
Figure 3B:
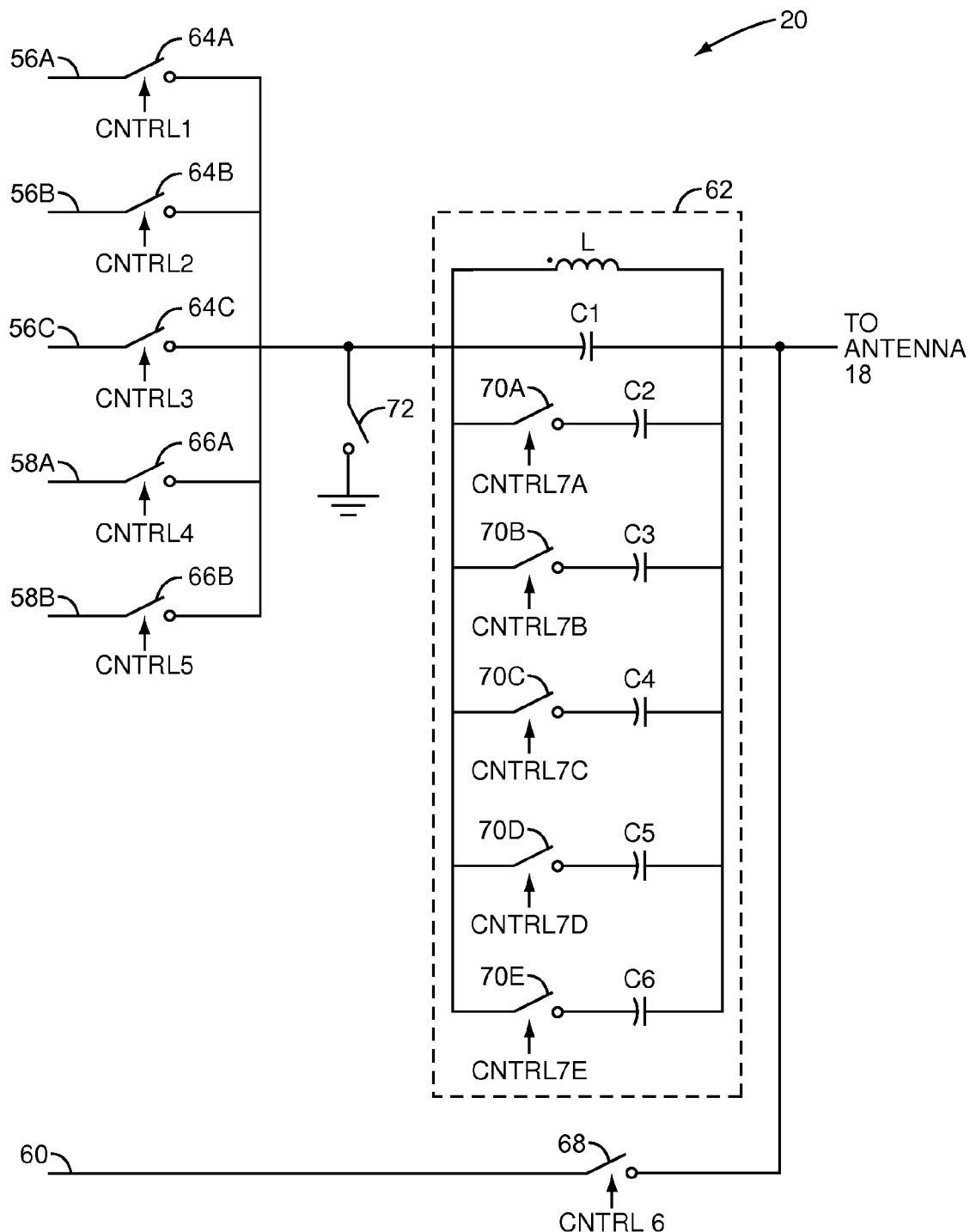

FIGS. 3A and 3B illustrate exemplary embodiments of the resonant tank circuitry 62. As illustrated in FIG. 3A, the resonant tank circuitry 62 includes an inductor L, capacitors C1 and C2, and switch 70. As will be appreciated by one of ordinary skill in the art, the resonant tank circuitry 62 has a first resonant frequency f1 when the switch 70 is open and a second resonant frequency f2 when the switch 70 is closed. The values for the inductor L and capacitors C1 and C2 are predetermined such that the first resonant frequency f1 is essentially equal to a center frequency of a transmit frequency band of the FDD transceiver 16, and the second resonant frequency f2 corresponds to a low impedance for the transmit and receive frequencies associated with the ports 56A-56C and 58A-58B for TDMA operation.

Shunt switch 72 is optional and may be included to provide additional isolation during FDD operation. More specifically, control signal CNTRL8 may be provided by the control system 24 such that the shunt switch 72 is closed to provide a shunt path to ground, or some other reference voltage, during FDD operation.

As an example of the operation of the switching circuitry 20 of FIG. 3A, if the mobile terminal 10 (FIG. 1) supports the GSM bands and UTRA/FDD band I described in Table 1 above, the first resonant frequency f1 may be approximately equal to a center frequency of the transmit frequency band of UTRA/FDD band I, which is approximately 1950 MHz. The second resonant frequency f2 may be equal to approximately 3600 MHz to provide attenuation of the second harmonic of the high band transmit frequency bands (GSM 1800 and GSM 1900). Thus, in operation, when in FDD mode, the switch 70 is opened and the resonant frequency of the resonant tank circuitry 62 is set to the first resonant frequency f1, which for this example is 1950 MHz. As a result, the switches 64A-64C and 66A-66B are isolated from the antenna 18. When operating in one of the GSM bands, the switch 70 is closed and the resonant frequency of the resonant tank circuitry 62 is set to the second resonant frequency f2, which for this example is 3600 MHz. As a result, the switches 64A-64C and 66A-66B are effectively coupled to the antenna 18. In addition, when operating in either the GSM 1800 or the GSM 1900 band, the resonant tank circuitry 62 operates to attenuate the second harmonics of the transmit frequencies.

When operating in either the GSM 850 or the EGSM 900 band, the switch 70 may optionally be opened. This would be beneficial when the desired UTRA/FDD band is one of UTRA/FDD bands I-IV. Since the first resonant frequency is 1950 MHz for this example, by opening the switch 70 when operating in either the GSM 850 or EGSM 900 bands, the resonant tank circuitry 62 provides attenuation of the second harmonic of the transmit frequencies for GSM 850 and EGSM 900.

It should be noted that, in a similar fashion, the resonant frequencies f1 and f2 may be predetermined to accommodate any one of the UTRA/FDD bands and the GSM frequency bands.

FIG. 3B illustrates an embodiment of the resonant tank circuitry 62 having multiple states corresponding to multiple FDD frequency bands. More particularly, the resonant tank circuitry 62 of this embodiment has multiple states corresponding to the five UTRA/FDD bands. As an example, switches 70A-70E are controlled by control signals CNTRL7A-CNTRL7E from the control system 24. For UTRA/FDD band I, all of the switches 70A-70E may be opened to provide a first resonant frequency approximately equal to a center frequency of the transmit band for UTRA/FDD band I. For UTRA/FDD band II, switch 70A may be closed and switches 70B-70E may be opened to provide a second resonant frequency approximately equal to a center frequency of the transmit band for UTRA/FDD band II. Similarly, the switches 70A-70E may be controlled to provide third, fourth, and fifth resonant frequencies approximately equal to a center frequency of the transmit band for UTRA/FDD bands III-V. All of the switches 70A-70E may be closed when operating in one of the GSM bands to provide a sixth resonant frequency such that the switches 64A-64C and 66A-66B are not isolated from the antenna 18. Optionally, the sixth resonant frequency may be selected to attenuate the second harmonic of the transmit frequency for GSM 1800 and GSM 1900. For the low band GSM frequency bands (GSM 850 and EGSM 900), the switches 70A-70E may optionally be controlled such that the resonant tank circuitry 62 attenuates the second harmonic of the transmit frequencies of the low band GSM frequency bands.

It should be noted that the embodiments of the resonant tank circuitry 62 illustrated in FIGS. 3A and 3B are exemplary. The resonant tank circuitry 62 may include any circuitry that may be controlled to provide high impedance at desired frequencies. Further, the embodiment of FIG. 3B may include any number of capacitors and switches depending on the particular implementation and the number of frequency bands that the user desires to accommodate.

In sum, the present invention provides switching circuitry 20 coupling the antenna 18 to a desired TDMA transmit or receive path during TDMA operation and coupling the antenna 18 to the FDD transceiver 16 during FDD operation. The switching circuitry 20 includes the resonant tank circuitry 62 having a controllable resonant frequency that is controlled to isolate the TDMA transmit and receive paths from the antenna 18 during FDD operation. As a result of the isolation provided by the resonant tank circuitry 62, the linearity of the switching circuitry 20 is improved for FDD operation such that intermodulation distortion is reduced.

Those skilled in the art will recognize improvements and modifications to the preferred embodiments of the present invention. All such improvements and modifications are considered within the scope of the concepts disclosed herein and the claims that follow.

What is claimed is:

1. Switching circuitry for a mobile terminal having a Time Division Multiple Access (TDMA) mode of operation and a Frequency Division Duplex (FDD) mode of operation comprising:
   resonant tank circuitry having a controllable resonant frequency controlled by at least one control signal and an output coupled to an antenna;
   at least one receive path switch adapted to couple at least one receiver front end to an input of the resonant tank circuitry when the mobile terminal is in a receive mode during TDMA operation;
   at least one transmit path switch adapted to couple at least one transmit circuit to the input of the resonant tank circuitry when the mobile terminal is in a transmit mode during TDMA operation; and
   a FDD switch adapted to couple a FDD transceiver to the output of the resonant tank circuitry during FDD operation;
   wherein the at least one control signal is provided such that the resonant tank circuitry substantially isolates the at least one receive path switch and the at least one transmit path switch from the antenna during FDD operation.

2. The switching circuitry of claim 1 wherein the FDD mode of operation comprises a Universal Mobile Telecommunication System Terrestrial Radio Access (UTRA) FDD mode of operation.

3. The switching circuitry of claim 2 wherein the TDMA mode of operation comprises a Global System for Mobile Communication (GSM) mode of operation.

4. The switching circuitry of claim 3 wherein the at least one transmit circuit comprises a high band GSM transmit circuit and a low band GSM transmit circuit, and the at least one transmit path switch comprises:
   a first transmit path switch adapted to couple the high band GSM transmit circuit to the input of the resonant tank circuitry when the mobile terminal is in a high band transmit mode during GSM operation; and
   a second transmit path switch adapted to couple the low band GSM transmit circuit to the input of the resonant tank circuitry when the mobile terminal is in a low band transmit mode during GSM operation.

5. The switching circuitry of claim 4 wherein the at least one receiver front end comprises a first receiver front end and a second receiver front end, each adapted to receive radio frequency signals in a receive frequency band selected from a group of receive frequency bands consisting of the GSM 850 frequency band, the Extended Global System for Mobile Communication (EGSM) 900 frequency band, the GSM 1800 frequency band, and the GSM 1900 frequency band, and the at least one receive path switch comprises:
   a first receive path switch adapted to couple the first receiver front end to the input of the resonant tank circuitry when the mobile terminal is in a first receive mode during GSM operation; and
   a second receive path switch adapted to couple the second receiver front end to the input of the resonant tank circuitry when the mobile terminal is in a second receive mode during GSM operation.

6. The switching circuitry of claim 1 wherein the resonant tank circuitry is configured such that the resonant tank circuitry provides a high impedance at the controllable resonant frequency of the resonant tank circuitry.

7. The switching circuitry of claim 6 wherein the at least one control signal is further provided such that the controllable resonant frequency is approximately equal to a center frequency of a FDD transmit frequency band of the FDD transceiver during FDD operation.

8. The switching circuitry of claim 6 wherein the at least one control signal is further provided such that the controllable resonant frequency is approximately equal to a center frequency of a desired one of a plurality of FDD transmit frequency bands corresponding to a transmit frequency band of the FDD transceiver during FDD operation.

9. The switching circuitry of claim 6 wherein the at least one control signal is further provided such that the controllable resonant frequency is equal to a desired resonant frequency providing a low impedance connection between the at least one receive path and transmit path switches and the antenna during TDMA operation.

10. The switching circuitry of claim 9 wherein the desired resonant frequency during TDMA operation is approximately equal to a harmonic of a center frequency of a frequency band of the at least one transmit circuit.

11. The switching circuitry of claim 1 wherein the resonant tank circuitry has a band-stop filter response having a maximum impedance at the controllable resonant frequency of the resonant tank circuitry.

12. The switching circuitry of claim 11 wherein the resonant tank circuitry comprises a parallel LC circuit having a controllable capacitance.

13. A mobile terminal having a Time Division Multiple Access (TDMA) mode of operation and a Frequency Division Duplex (FDD) mode of operation comprising:
- at least one receiver front end adapted to receive radio frequency signals in a TDMA receive frequency band;
- at least one transmit circuit adapted to transmit radio frequency signals in a TDMA transmit frequency band;
- FDD transceiver circuitry adapted to simultaneously transmit radio frequency signals in a FDD transmit frequency band and receive radio frequency signals in a FDD receive frequency band; and
- switching circuitry comprising:
  - resonant tank circuitry having a controllable resonant frequency controlled by at least one control signal and an output coupled to an antenna;
  - at least one receive path switch adapted to couple the at least one receiver front end to an input of the resonant tank circuitry when in a receive mode during TDMA operation;
  - at least one transmit path switch adapted to couple the at least one transmit circuit to the input of the resonant tank circuitry when in a transmit mode during TDMA operation; and
  - a FDD switch adapted to couple the FDD transceiver circuitry to the output of the resonant tank circuitry during FDD operation;
- wherein the at least one control signal is provided such that the resonant tank circuitry substantially isolates the at least one receive path switch and the at least one transmit path switch from the antenna during FDD operation.

14. The mobile terminal of claim 13 wherein the FDD mode of operation comprises a Universal Mobile Telecommunication System Terrestrial Radio Access (UTRA) FDD mode of operation.

15. The mobile terminal of claim 14 wherein the TDMA mode of operation comprises a Global System for Mobile Communication (GSM) mode of operation.

16. The mobile terminal of claim 15 wherein the at least one transmit circuit comprises a high band GSM transmit circuit and a low band GSM transmit circuit, and the at least one transmit path switch comprises:
- a first transmit path switch adapted to couple the high band GSM transmit circuit to the input of the resonant tank circuitry when the mobile terminal is in a high band transmit mode during GSM operation; and
- a second transmit path switch adapted to couple the low band GSM transmit circuit to the input of the resonant tank circuitry when the mobile terminal is in a low band transmit mode during GSM operation.

17. The mobile terminal of claim 16 wherein the at least one receiver front end comprises a first receiver front end and a second receiver front end, each adapted to receive radio frequency signals in a receive frequency band selected from a group of receive frequency bands consisting of the GSM 850 frequency band, the Extended Global System for Mobile Communication (EGSM) 900 frequency band, the GSM 1800 frequency band, and the GSM 1900 frequency band, and the at least one receive path switch comprises:
- a first receive path switch adapted to couple the first receiver front end to the input of the resonant tank circuitry when the mobile terminal is in a first receive mode during GSM operation; and
- a second receive path switch adapted to couple the second receiver front end to the input of the resonant tank circuitry when the mobile terminal is in a second receive mode during GSM operation.

18. The mobile terminal of claim 13 further comprising a control system adapted to provide the at least one control signal.

19. The mobile terminal of claim 13 wherein the resonant tank circuitry is configured such that the resonant tank circuitry provides a high impedance at the controllable resonant frequency of the resonant tank circuitry.

20. The mobile terminal of claim 19 wherein the at least one control signal is further provided such that the controllable resonant frequency is approximately equal to a center frequency of the FDD transmit frequency band of the FDD transceiver circuitry during FDD operation.

21. The mobile terminal of claim 19 wherein the at least one control signal is further provided such that the controllable resonant frequency is approximately equal to a center frequency of a desired one of a plurality of FDD transmit frequency bands corresponding to a transmit frequency band of the FDD transceiver circuitry during FDD operation.

22. The mobile terminal of claim 19 wherein the at least one control signal is further provided such that the controllable resonant frequency is equal to a desired resonant frequency providing a low impedance connection between the at least one receive path and transmit path switches and the antenna during TDMA operation.

23. The mobile terminal of claim 22 wherein the desired resonant frequency during TDMA operation is approximately equal to a harmonic of a center frequency of a frequency band of the at least one transmit circuit.

24. The mobile terminal of claim 13 wherein the resonant tank circuitry has a band-stop filter response having a maximum impedance at the controllable resonant frequency of the resonant tank circuitry.

25. The mobile terminal of claim 24 wherein the resonant tank circuitry comprises a parallel LC circuit having a controllable capacitance.

26. A method of switching between a Time Division Multiple Access (TDMA) mode of operation and a Frequency Division Duplex (FDD) mode of operation in a mobile terminal comprising:
- providing resonant tank circuitry having a controllable resonant frequency controlled by at least one control signal and an output coupled to an antenna;
- providing at least one receive path switch adapted to couple at least one receiver front end to an input of the resonant tank circuitry when the mobile terminal is in a receive mode during TDMA operation;
- providing at least one transmit path switch adapted to couple at least one transmit circuit to the input of the resonant tank circuitry when the mobile terminal is in a transmit mode during TDMA operation;
- providing a FDD switch adapted to couple a FDD transceiver to the output of the resonant tank circuitry during FDD operation; and
- providing the at least one control signal such that the resonant tank circuitry substantially isolates the at least one receive path switch and the at least one transmit path switch from the antenna during FDD operation.

* * * * *